United States Patent
Hase (10) Patent No.: US 6,212,021 B1
(45) Date of Patent: *Apr. 3, 2001

(54) OPTICAL APPARATUS HAVING TEMPERATURE COMPENSATING FUNCTION

(75) Inventor: Hiroyuki Hase, Chigasaki (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/031,016

(22) Filed: Feb. 26, 1998

(30) Foreign Application Priority Data

Mar. 7, 1997 (JP) .................................. 9-053017

(51) Int. Cl.$^7$ ...................................... G02B 7/02
(52) U.S. Cl. ............................................ 359/820
(58) Field of Search ..................... 359/820, 699

(56) References Cited

U.S. PATENT DOCUMENTS 4,162,120 * 7/1979 Moreno ................................ 350/253
5,679,946 * 10/1997 Mukai et al. ....................... 250/201.2
5,760,676 * 6/1998 DeLaMatyr et al. ................ 359/820

FOREIGN PATENT DOCUMENTS

| 59-1600107 | * 9/1984 | (JP) | .................. G02B/7/11 |
| 5-249359 | 9/1993 | (JP) | .................. G02B/7/02 |
| 7-140405 | 6/1995 | (JP) | .................. G02B/26/10 |
| 7-301738 | 11/1995 | (JP) | .................. G02B/7/02 |

* cited by examiner

Primary Examiner—George Epps
Assistant Examiner—Sared Seyrafi
(74) Attorney, Agent, or Firm—Robin, Blecker & Daley (57) ABSTRACT

An optical apparatus having a temperature compensating function includes an optical element holding frame arranged to hold an optical element, a support member arranged to support the optical element holding frame for movement in a direction of an optical axis and having a cam for moving the optical element holding frame in the direction of the optical axis, and a correction member arranged to expand or contract in a direction orthogonally intersecting the optical axis according to temperature variation, wherein the optical element holding frame rotates in association with expansion or contraction of the correction member so as to be moved in the direction of the optical axis along the cam of the support member.

3 Claims, 11 Drawing Sheets

OPTICAL APPARATUS HAVING TEMPERATURE COMPENSATING FUNCTION

BACKGROUND OF THE INVENTION

1. Field of the Invention

The present invention relates to an optical apparatus having a temperature compensating function, and more particularly, to an optical element position correcting device, a focusing device or a lens barrel arranged, for example, to automatically correct changes in focus by correcting changes in position of a lens or a like optical element caused by temperature variation.

2. Description of Related Art

Many of low-priced cameras, particularly, fixed focus cameras, recently marketed are provided with built-in lens units which are composed of molded lenses or combinations of glass lenses and molded lenses, instead of glass lenses.

In cases where a lens unit includes a molded lens, however, the shape and refractive index of the lens tend to be changed by temperature variation. The image forming position of a lens unit of such a kind shifts forward in a low temperature environment and backward in a high temperature condition, thereby causing a deviation in focus. To solve this problem, in the case of the lens barrel which has a focus driving means and causes the focus driving means to draw out a photo-taking lens unit in the direction of an optical axis so as to adjust focus, the temperature of environment is detected by a temperature sensor disposed within the camera body, and a focus deviation resulting from temperature variation is corrected by changing the amount of drawing-out of the photo-taking lens according to the environment temperature detected.

In the case of the lens barrel having no focus driving means, a focus deviation due to temperature variation is corrected by stopping down a maximum diaphragm aperture.

A zoom lens barrel disclosed in Japanese Laid-Open Patent Application No. HEI 5-236322 is arranged to move an image sensor which is provided for converting a focused image into an electrical signal in the direction of an optical axis according to temperature variation, so that a sharply focused image can be obtained at the time of zooming. In the case of such a zoom lens, the image sensor is secured to a holding member which is arranged in a hat-like sectional shape to expand or contract in the direction of the optical axis according to temperature variation, and the holding member is secured to the body of the lens barrel.

A lens barrel disclosed in Japanese Laid-Open Patent Application No. SHO 60-194416 is arranged to correct focus deviations due to temperature variation as follows. Expansion or contraction of the lens barrel in the direction of its optical axis caused by temperature variation is mechanically detected. The mechanical change detected is optically converted into an amount of optical displacement. Then, a focusing lens is moved with a motor in such a way as to cancel out the amount of optical displacement.

Further, in an arrangement disclosed in Japanese Laid-Open Patent Application HEI 8-15595, the movement of a long bar which extends in the direction of an optical axis and is arranged to elongate and contract according to temperature variation is transmitted to an arm by utilizing leverage. The arm then causes the position in the direction of the optical axis of a condenser lens to vary in the direction opposite to the elongating direction of the bar in such a way as to correct the focus position of the condenser lens.

However, the conventional arrangement mentioned above has presented the following problems. In the case of the lens barrel having a focus driving means, it is necessary to have a temperature sensor arranged to detect environment temperature. The use of the temperature sensor, however, not only causes an increase in cost but also results in a complex structural arrangement for control over a lens unit drawing-out action.

As for the lens barrel having no focus driving means, the F-number of the lens becomes a darker F-number, because the full-open (maximum) aperture of its diaphragm is stopped down, as mentioned above.

The zoom lens barrel disclosed in Japanese Laid-Open Patent Application No. HEI 5-236322 is arranged to correct a focus deviation at the time of zooming by moving the image sensor in the direction of the optical axis to correct an image forming position where a back focal distance is changed by expansion and contraction of the lens barrel body due to temperature variation. If the lens unit of the zoom lens barrel is a lens unit composed of molded lenses, however, the focus of the lens unit would be caused to deviate by changes in shape and refractive index of the lens unit resulting from changes of environment temperature.

The lens barrel disclosed in Japanese Laid-Open Patent Application No. SHO 60-194416 is arranged to correct focus deviations due to temperature variation by carrying out feedback control as follows. Expansion or contraction of the lens barrel in the direction of its optical axis due to temperature variation is mechanically detected. The mechanical change thus detected is converted into an amount of optical displacement. The focusing lens is driven and moved by the motor to cancel out the optical displacement. Adoption of this arrangement, however, results in a complex structure of the lens barrel.

In the arrangement disclosed in Japanese Laid-Open Patent Application No. HEI 8-15595, the movement of the long bar which extends in the direction of the optical axis and elongates or contracts according to temperature variation is transmitted to the arm by utilizing leverage. The focus position obtained by the condenser lens is corrected by varying the position in the direction of the optical axis in the direction opposite to the elongating direction of the bar. This arrangement, however, not only makes the structure of an optical apparatus complex but also does not apply to a case where the lens position is to be shifted for correction in the elongating direction of the bar.

BRIEF SUMMARY OF THE INVENTION

It is a first object of the invention to provide an optical element position correcting device which can be compactly arranged and yet be capable of correcting deviations in position of an optical element such as a lens due to temperature variation.

It is a second object of the invention to provide an optical element position correcting device which can be compactly arranged and yet be capable of correcting deviations in position of an optical element, such as a lens, due to temperature variation by moving the optical element in the same direction as a direction in which a correction member expands or contracts.

It is a third object of the invention to provide an optical element position correcting device which can be compactly arranged and yet be capable of correcting deviations in position of an optical element, such as a lens, due to temperature variation by utilizing optical element driving means to move the optical element in the same direction as a direction in which a correction member expands or contracts.

It is a fourth object of the invention to provide an optical element position correcting device which can be compactly arranged and yet be capable of correcting deviations in position of an optical element, such as a lens, due to temperature variation by utilizing optical element driving means for that purpose.

It is a fifth object of the invention to provide an optical element position correcting device which is arranged to permit setting an amount of moving an optical element for correcting deviations of its position due to temperature variation in addition to attaining the above-stated first and fourth objects.

It is a sixth object of the invention to provide an optical element position correcting device which is arranged to permit forming a position correcting member in a simple manner in addition to attaining the above-stated first, second, third, fourth and fifth objects.

It is a seventh object of the invention to provide a focusing device which is provided with the above-stated optical element position correcting device.

It is an eighth object of the invention to provide an optical apparatus having the above-stated optical element position correcting device.

It is a ninth object of the invention to provide an optical apparatus having the above-stated focusing device.

To attain the above objects, in accordance with a first aspect of the invention, there is provided an optical apparatus, which comprises an optical element holding frame arranged to hold an optical element, a support member arranged to support the optical element holding frame for movement in a direction of an optical axis and having a cam for moving the optical element holding frame in the direction of the optical axis, and a correction member arranged to expand or contract in a direction orthogonally intersecting the optical axis according to temperature variation, wherein the optical element holding frame rotates in association with expansion or contraction of the correction member so as to be moved in the direction of the optical axis along the cam of the support member.

In accordance with a second aspect of the invention, there is provided an optical apparatus, which comprises an optical element holding frame arranged to hold an optical element, and a correction member arranged to expand or contract in a direction parallel with an optical axis according to temperature variation, wherein the optical element holding frame moves in a direction of the optical axis in association with expansion or contraction of the correction member.

In accordance with a third aspect of the invention, there is provided an optical apparatus, which comprises an optical element holding frame arranged to hold an optical element, a rotatable cam gear having a cam for causing the optical element holding frame to move in a direction of an optical axis, optical element driving means for driving the cam gear, and a correction member provided on the optical element holding frame and arranged between the optical element holding frame and the cam gear to expand or contract in a direction parallel with the optical axis according to temperature variation, wherein the optical element holding frame moves integrally with the correction member in the direction of the optical axis in association with expansion or contraction of the correction member.

In accordance with a fourth aspect of the invention, there is provided an optical apparatus, which comprises an optical element holding frame arranged to hold an optical element, a support member arranged to support the optical element holding frame for movement in a direction of an optical axis and having a cam for causing the optical element holding frame to move in the direction of the optical axis, an actuator for driving the optical element holding frame, and a correction member arranged to expand or contract in a direction orthogonally intersecting the optical axis according to temperature variation, wherein the actuator moves in the direction orthogonally intersecting the optical axis in association with expansion or contraction of the correction member, and the optical element holding frame rotates following the movement of the actuator to be moved in the direction of the optical axis along the cam of the support member.

These and other objects and features of the invention will become apparent from the following detailed description of preferred embodiments thereof taken in conjunction with the accompanying drawings.

DETAILED DESCRIPTION OF THE INVENTION

Hereinafter, preferred embodiments of the invention will be described in detail with reference to the drawings.

First Embodiment

Figure 1:
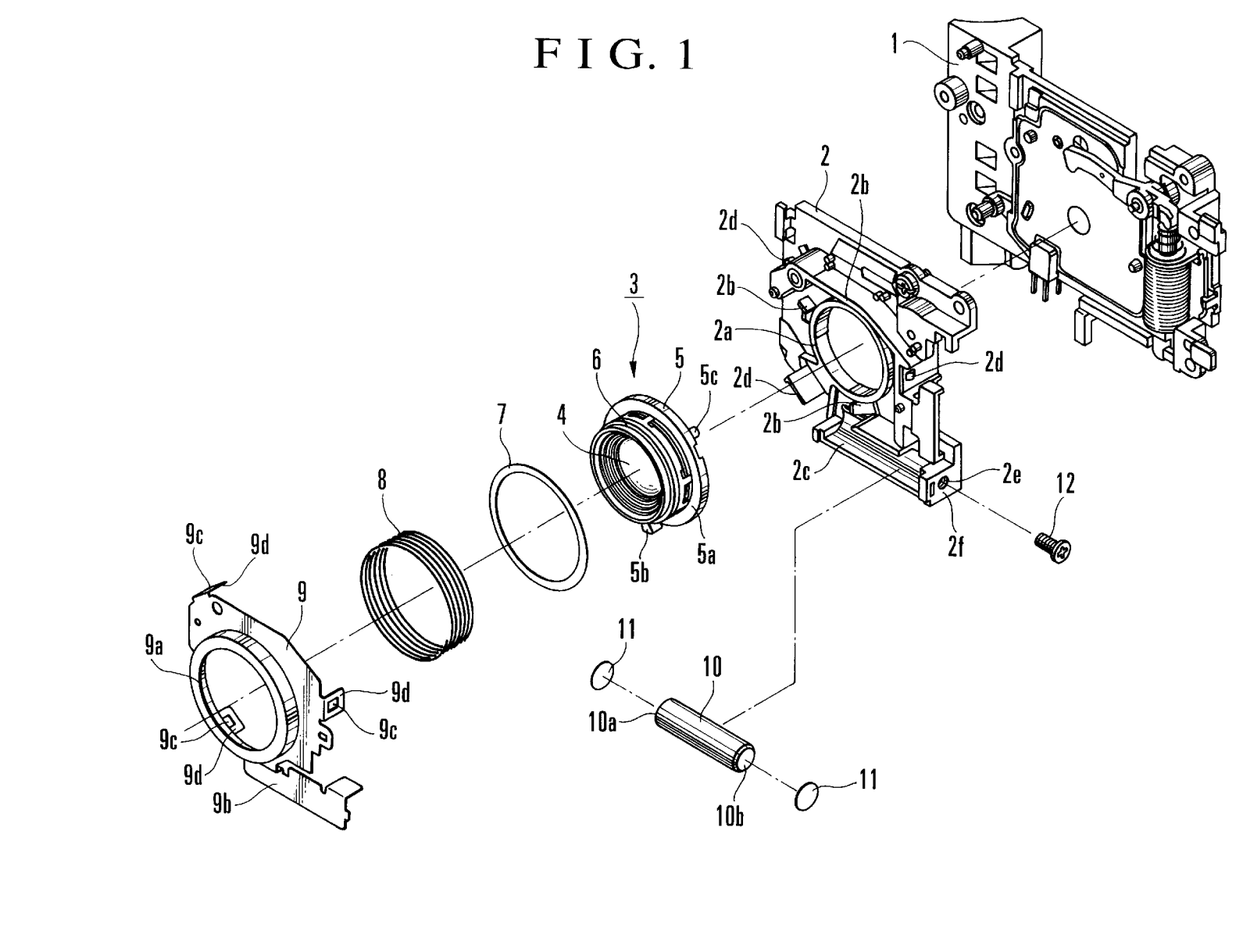
FIG. 1 is an exploded perspective view showing a lens barrel according to a first embodiment of the invention.
Figure 2:
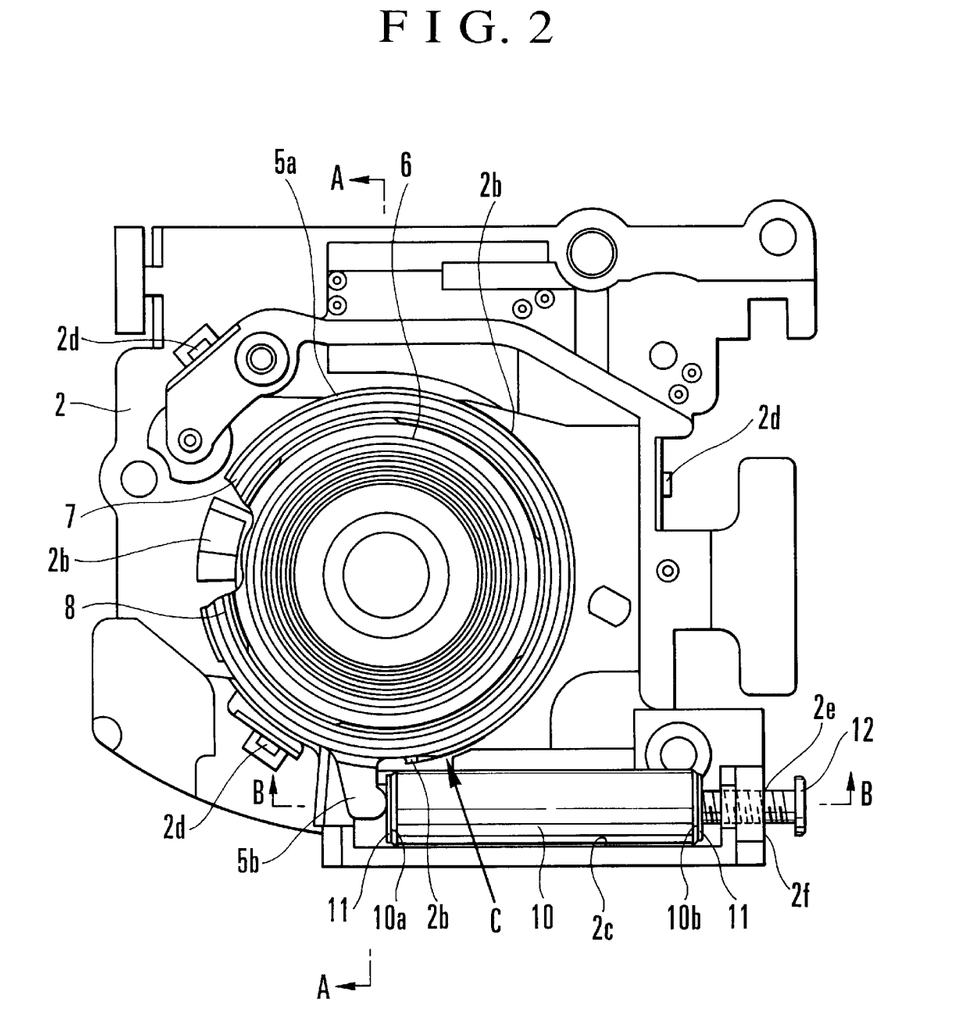
FIG. 2 is a front view showing essential parts of the lens barrel shown in FIG. 1.
Figure 3:
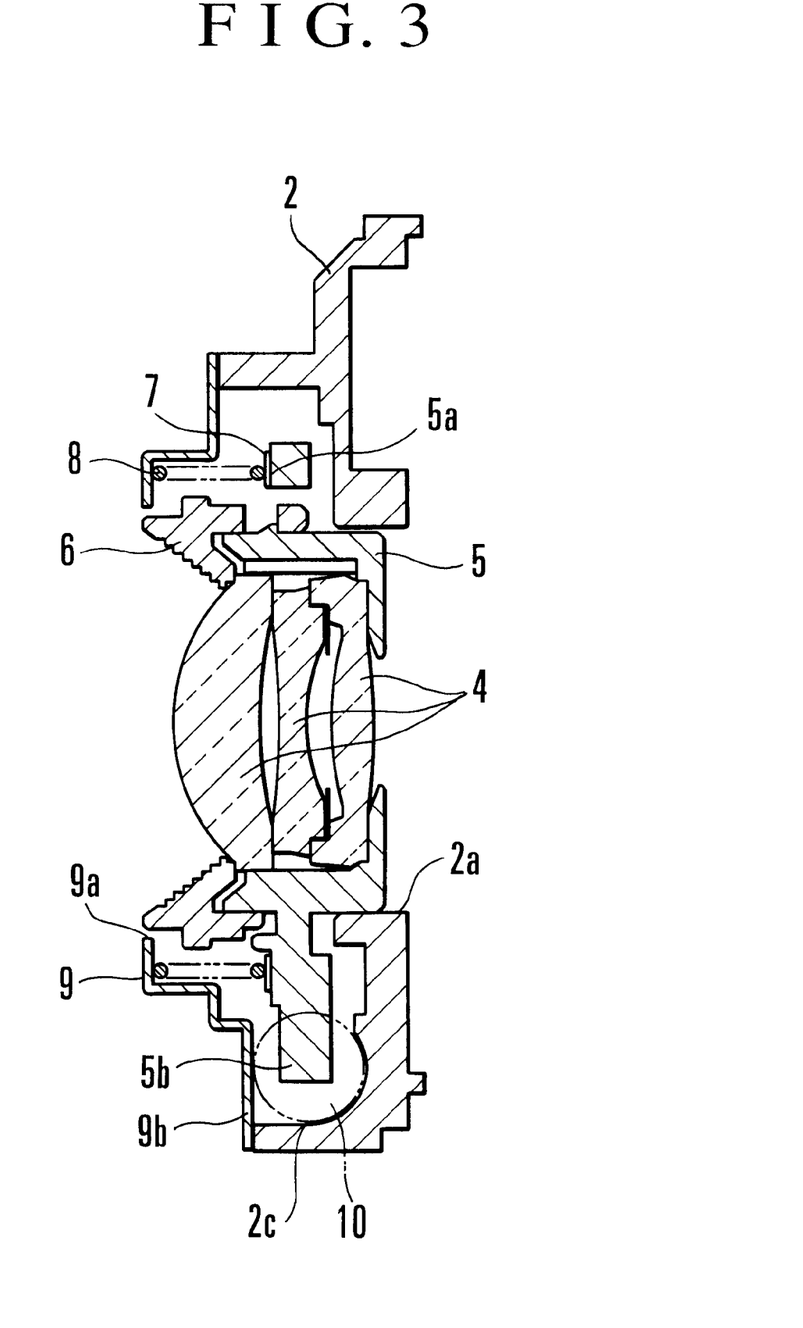
FIG. 3 is a sectional view taken along a line A—A shown in FIG. 2.
Figure 4A:
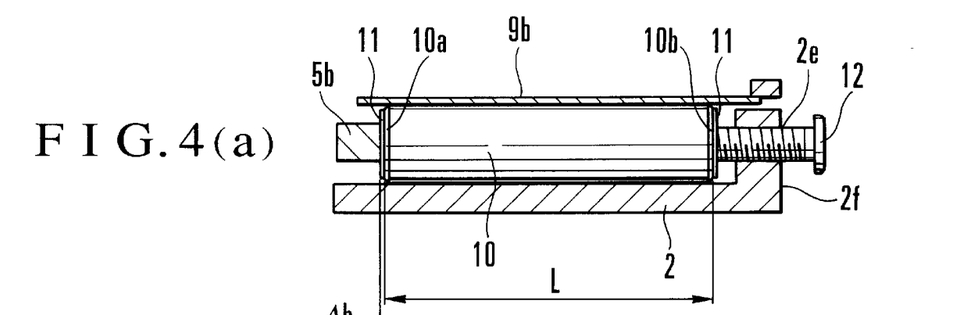
FIGS. 4(a), 4(b) and 4(c) are sectional views taken along a line B—B of FIG. 2 to show the expanding and contracting states of a correction member caused by temperature variation, wherein the correction member is shown in a high temperature state in FIG. 4(a), in a normal temperature state in FIG. 4(b) and in a low temperature state in FIG. 4(c).
Figure 4B:
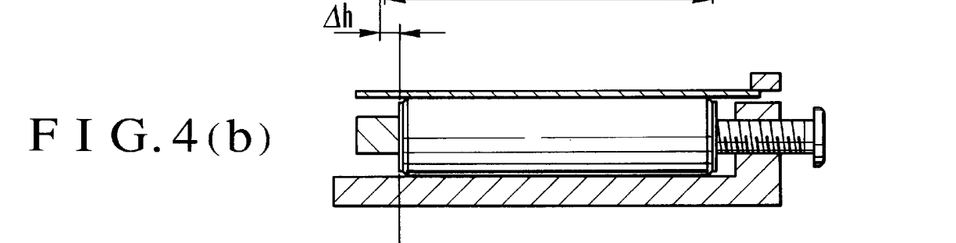
Figure 4C:
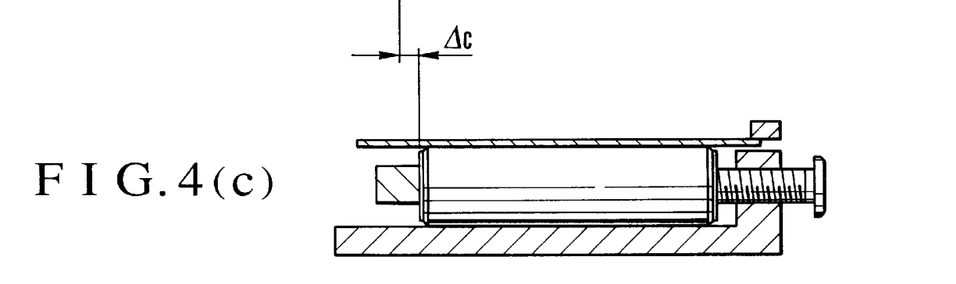
Figure 5A:
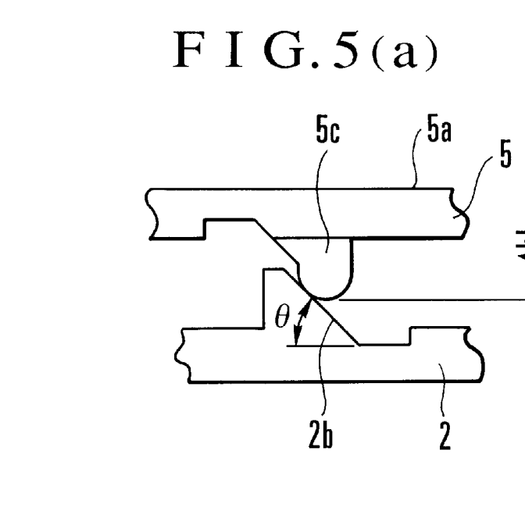
FIGS. 5(a), 5(b) and 5(c) are enlarged views of a part taken as indicated by an arrow C in FIG. 2 to show a lens unit in the states of being caused to move in the direction of an optical axis by expansion and contraction of a focus correcting shaft, wherein the lens unit is shown in a high temperature state in FIG. 5(a), in a normal temperature state in FIG. 5(b) and in a low temperature state in FIG. 5(c).
Figure 5B:
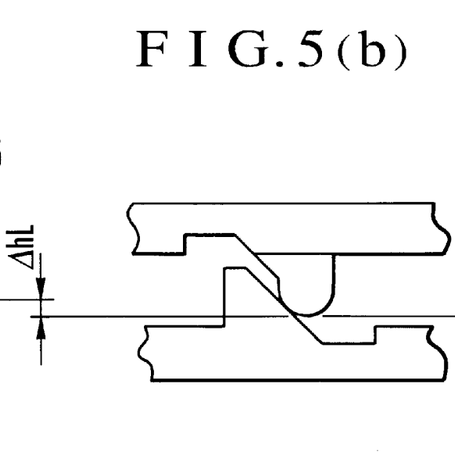
Figure 5C:
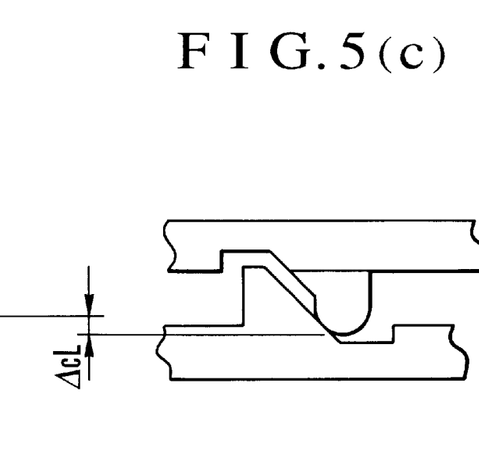

FIG. 1 to FIGS. 5(a), 5(b) and 5(c) show a first embodiment of the invention. FIG. 1 shows the lens barrel in an exploded perspective view. FIG. 2 is a front view showing essential parts of the lens barrel. FIG. 3 is a sectional view taken along a line A—A shown in FIG. 2. FIGS. 4(a), 4(b) and 4(c) are sectional views taken along a line B—B shown in FIG. 2 to show the expanding and contacting states of a correction member (hereinafter referred to as a focus correcting shaft) caused by temperature variation. The focus correcting shaft is shown in a high temperature state in FIG. 4(a), in a normal temperature state in FIG. 4(b) and in a low temperature state in FIG. 4(c). FIGS. 5(a), 5(b) and 5(c) are enlarged views of a part taken as indicated by an arrow C in FIG. 2 to show a lens unit in the states of being caused to move in the direction of an optical axis by expansion and contraction of the focus correcting shaft. The lens unit is shown in a high temperature state in FIG. 5(a), in a normal temperature state in FIG. 5(b) and in a low temperature state in FIG. 5(c).

Referring to FIG. 1 to FIGS. 5(a), 5(b) and 5(c), a shutter unit 1 is arranged to adjust the amount of an exposure. A support member 2 (hereinafter referred to as a lens base plate) is arranged to support a lens unit 3 in such a way as to have the lens unit 3 movable in the direction of its optical axis. The lens base plate 2 is secured to the shutter unit 1 with screws or the like.

In the lens base plate 2, there is formed an aperture part 2a, in which the lens unit 3 is rotatably and movably fitted. Three cam faces 2b which protrude forward are formed around the aperture part 2a to have the aperture part 2a at a center part among them. The three cam faces 2b are arranged to not only support the lens unit 3 in such a way as to have the lens unit 3 movable in the direction of the optical axis but also to cause the lens unit 3 which is rotating to move in the direction of the optical axis. Further, in the lens base plate 2, there are formed a recessed part 2c of a U-like sectional shape, which is arranged to hold a focus correcting shaft 10 and extends in the direction orthogonally intersecting the optical axis, three lock claws 2d which are arranged to lock a retaining plate 9 in position, and a wall 2f which protrudes forward and is provided with a screw hole 2e for having an adjustment screw 12 mounted thereon.

The lens unit 3 is composed of a photo-taking lens 4, a lens holding frame 5 which is arranged to hold the photo-taking lens 4, and a lens fixing frame 6 which is secured to the lens holding frame 5 and arranged to have the photo-taking lens 4 secured thereto. The periphery of the lens holding frame 5 is rotatably and movably fitted in the aperture part 2a of the lens base plate 2.

The periphery of the lens holding frame 5 has a flange-like rib 5a which protrudes from its whole circumference in the direction orthogonally intersecting the optical axis. An arm part 5b which has an R-shaped fore end extends from the side face of the rib 5a in the orthogonally intersecting direction. Three protruding parts 5c which have R-shaped fore ends protrude rearward from the rear face of the rib 5a. The lens unit 3 is supported by the lens base plate 2 by having the three protruding parts 5c abutting on the three cam faces 2b of the lens base plate 2. In this state, when the lens unit 3 rotates on the aperture part 2a of the lens base plate 2, the lens unit 3 moves forward or backward in the direction of the optical axis along the three cam faces 2b of the lens base plate 2.

A ring-like sheet 7 is arranged in front of the rib 5a of the lens holding frame 5 to prevent a cut part of a spring 8 from biting a planar part of the rib 5a of the lens holding frame 5 when the lens unit 3 rotates. The spring 8 is arranged between the sheet 7 and the retaining plate 9 to urge the lens unit 3 rearward so as to cause the three protruding parts 5c of the lens holding frame 5 to abut on the three cam faces 2b of the lens base plate 2.

The retaining plate 9 has a photo-taking aperture part 9a formed in its center part to be in a position to correspond to the lens unit 3, and is arranged to cover the lens unit 3, the focus correcting shaft 10 and sheets 11. The retaining plate 9 also has a planar part 9b which extends in the direction orthogonally intersecting the optical axis to cover the focus correcting shaft 10 and the sheets 11, and planar parts 9d which protrude rearward and have holes 9c. The retaining plate 9 is secured to the lens base plate 2 by locking the holes 9c of the planar parts 9d with the lock claws 2d of the lens base plate 2.

The focus correcting shaft 10 is formed in a cylindrical shape with a material which expands and contracts according to temperature variation (having a large coefficient of linear expansion). The focus correcting shaft 10 is thus arranged to correct a focus deviation caused by temperature variation. The focus correcting shaft 10 is arranged to extend in the direction orthogonally intersecting the optical axis and is disposed between the recessed part 2c and the planar part 9b of the retaining plate 9 as shown in FIG. 3. As shown in FIG. 2, one end face 10a of the focus correcting shaft 10 abuts on the arm part 5b of the lens holding frame 5 through the sheet 11, while the other end face 10b abuts on the fore end part of the adjustment screw 12 through the sheet 11.

The two sheets 11 are formed in disk-like shape and arranged to prevent the two end faces 10a and 10b of the focus correcting shaft 10 from being deformed. One of the sheets 11 is disposed between the arm part 5b of the lens holding frame 5 and the end face 10a of the focus correcting shaft 10. The other sheet 11 is disposed between the adjustment screw 12 and the end face 10b of the focus correcting shaft 10.

The adjustment screw 12 is inserted into the screw hole 2e formed in the wall 2f of the lens base plate 2 and is arranged to adjust any focus deviation which would be mechanically brought about. When the adjustment screw 12 is rotated clockwise, the adjustment screw 12 moves to the left to push and cause the focus correcting shaft 10 and the sheet 11 to move also to the left. Then, the arm part 5b of the lens holding frame 5 of the lens unit 3 is pushed by the end face 10a of the focus correcting shaft 10. This causes the lens holding frame 5 to rotate clockwise on the aperture part 2a of the lens base plate 2. At the same time, the lens holding frame 5 is pushed up in the direction of the optical axis along the three cam faces 2b of the lens base plate 2 while charging the spring 8. The focus of the lens unit 3 thus can be adjusted in the drawing-out direction of the lens unit 3. When the adjustment screw 12 is rotated counterclockwise, the adjustment screw 12 moves to the right. The spring force of the spring 8 which is in a charged state causes the lens holding frame 5 of the lens unit 3 to rotate counterclockwise or the aperture part 2a of the lens base plate 2 along the three cam faces 2b of the lens base plate 2 and thus to be pushed down in the direction of the optical axis. The focus of the lens unit 3 thus can be adjusted in the drawing-in direction of the lens unit 3. In this instance, the focus correcting shaft 10 is pushed by the arm part 5b of the lens holding frame 5 to move to the right following the adjustment screw 12.

The lens barrel having the above-described construction in the first embodiment operates as follows when environment temperature varies.

(i) When environment temperature has changed from normal temperature to high temperature, the focus correcting shaft 10 expands as much is a value Δh as shown in FIG. 4(a). In association with this expansion, the arm part 5b of the lens holding frame 5 of the lens unit 3 is pushed leftward by the end face 10a of the focus correcting shaft 10, so that the lens holding frame 5 is caused to rotate clockwise on the aperture part 2a of the lens base plate 2 and, at the same time, is pushed up in the direction of the optical axis as much as a value ΔhL along the three cam faces 2b of the lens base plate 2, as shown in FIG. 5(a), while charging the spring 8. Thus, a focus deviation under the high temperature condition can be corrected in this manner.

(ii) When environment temperature has changed from normal temperature to low temperature, the focus correcting shaft 10 contracts as much as a value Δc as shown in FIG. 4(c). In association with this contraction, the lens holding frame 5 of the lens unit 3 is caused by the spring force of the spring 8 to be pushed down in the direction of the optical axis as much as a value ΔcL, as shown in FIG. 5(c), while rotating counterclockwise on the aperture part 2a of the lens base plate 2 along the three cam faces 2b of the lens base plate 2. Thus, a focus deviation under the low temperature condition can be corrected in this manner.

(iii) When environment temperature has changed from high temperature to normal temperature, the focus correcting shaft 10 contracts as much as the value Δh as shown in FIG. 4(b). In association with this contraction, the action described in the above paragraph (ii) is performed to push down the lens holding frame 5 of the lens unit 3 as much as the value ΔhL, in the direction of the optical axis, to bring the lens unit 3 back to a state which is obtained under the normal temperature condition as shown in FIG. 5(b).

(iv) When environment temperature has changed from low temperature to normal temperature, the focus correcting shaft 10 expands as much as the value Δc as shown in FIG. 4(b). In association with this expansion, the action described in the above paragraph (i) is performed to push up the lens holding frame 5 of the lens unit 3 as much as the value ΔcL in he direction of the optical axis. The lens unit 3 thus can be brought back to the state obtained under the normal temperature condition as shown in FIG. 5(b).

In the first embodiment, the focus correcting shaft 10 which expands or contacts according to temperature variation is disposed in the direction orthogonally intersecting the optical axis. The lens unit 3 is caused to rotate in association with the expansion and contraction of the focus correcting shaft 10. Then, the lens unit 3 which is rotating moves forward or backward in the direction of the optical axis along the three cam faces 2b of the lens base plate 2. A lens barrel arranged in this manner gives images always in an in-focus state irrespective of temperature variation. It is possible to increase the movable amount, i.e., a focus correcting amount, of the lens unit 3 by varying the angle θ of the three cam faces 2b of the lens base plate 2, without increasing the total length L of the focus correcting shaft 10. In other words, the total length L of the focus correcting shaft 10 can be shortened for reduction in size of the lens barrel.

Second Embodiment

FIGS. 6, 7, 8(a), 8(b) and 8(c) relate to a lens barrel according to a second embodiment of the invention. The mechanical structure of the second embodiment is about the same as that of the first embodiment. Therefore, all the structural elements that are identical with those of the first embodiment are denoted in FIG. 6 to FIGS. 8(a), 8(b) and 8(c) by the same reference numerals as in FIG. 1 to FIGS. 5(a), 5(b) and 5(c), and the details of them are omitted in the following description.

Figure 6:
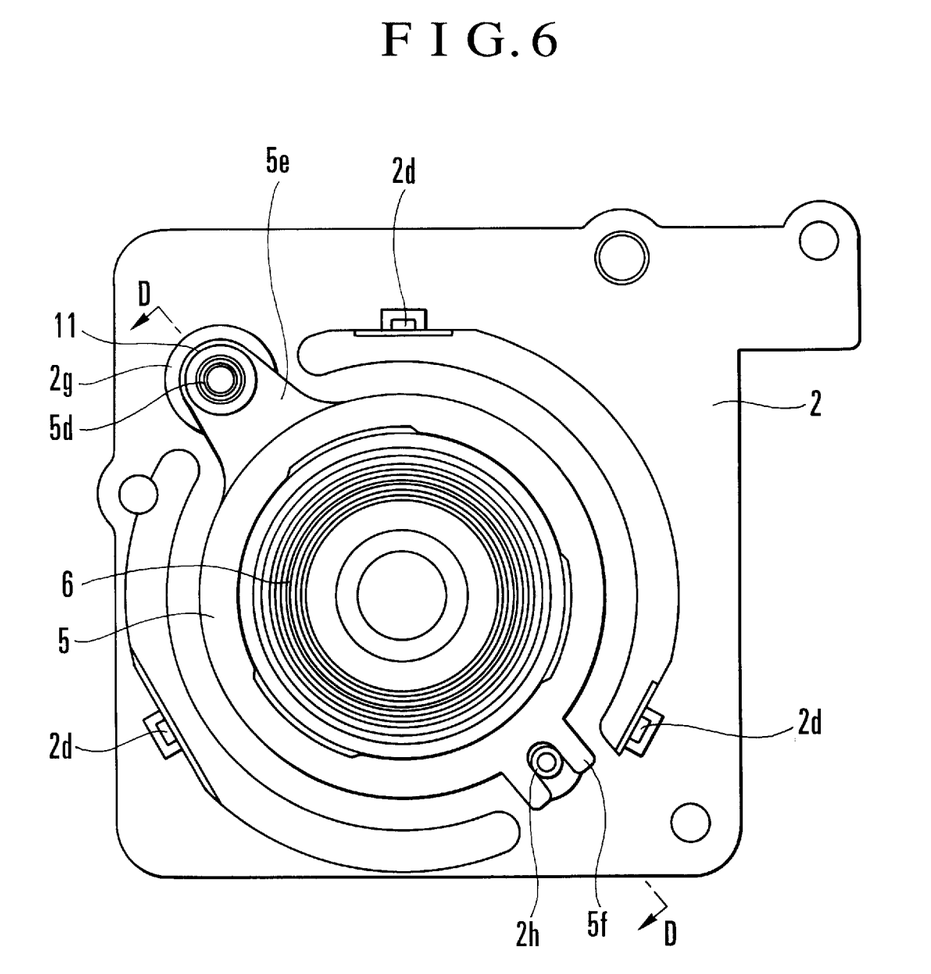
FIG. 6 is a front view showing essential parts of a lens barrel according to a second embodiment of the invention.
Figure 7:
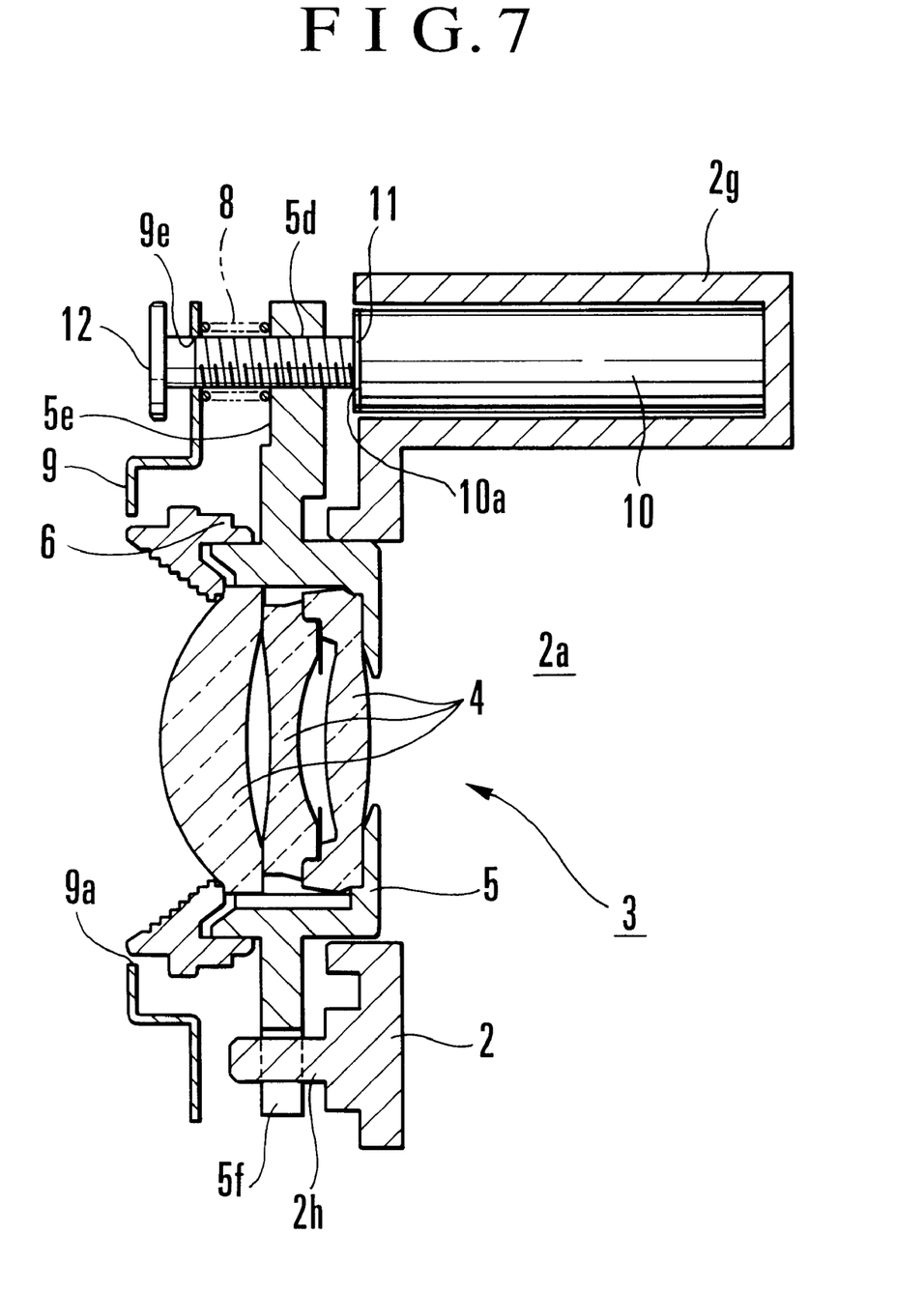
FIG. 7 is a sectional view taken along a line D—D shown in FIG. 6.
Figures 8A, 8B, 8C:
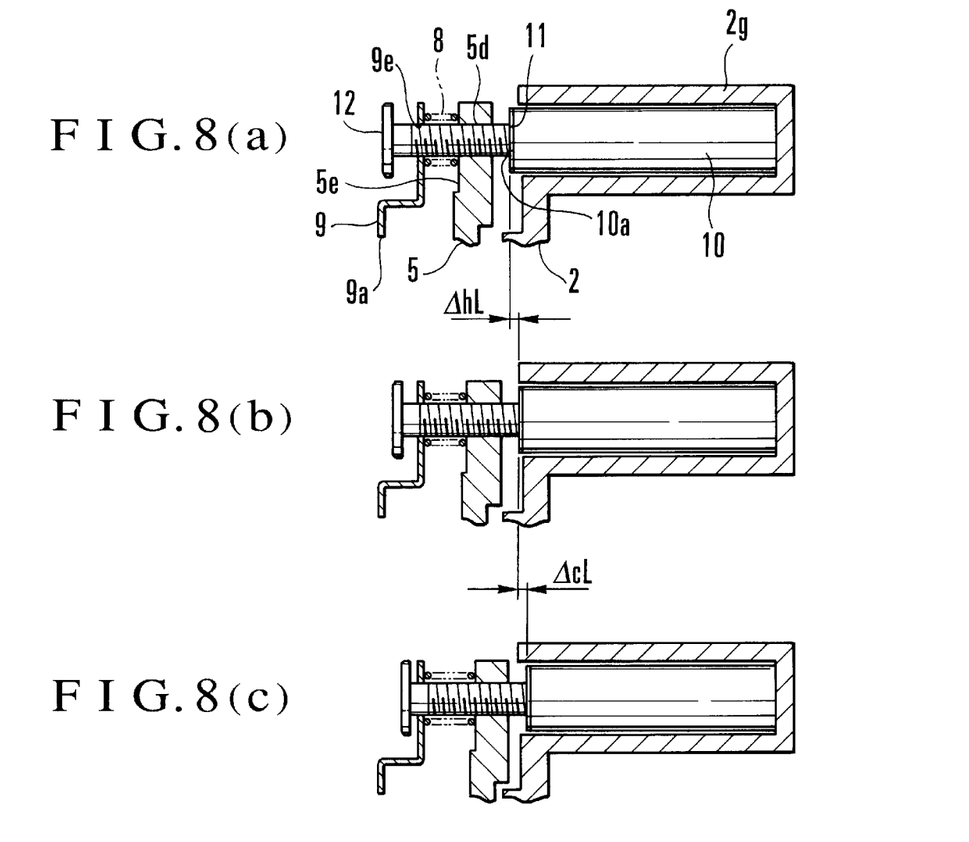
FIGS. 8(a), 8(b) and 8(c) are sectional views showing the states of a lens unit being caused to move in the direction of the optical axis by expansion and contraction of a correction member shown in FIG. 7, wherein the lens unit is shown in a high temperature state in FIG. 8(a), in a normal temperature state in FIG. 8(b) and in a low temperature state in FIG. 8(c).

FIG. 6 is a front view showing essential parts of the second embodiment. FIG. 7 is a sectional view taken along a line D—D shown in FIG. 6. FIGS. 8(a), 8(b) and 8(c) are sectional views showing expanded and contracted states of a correction member and moving states of a lens unit in the direction of its optical axis caused by temperature variation. The lens barrel is shown as a high temperature state in FIG. 8(a), in a normal temperature state in FIG. 8(b) and in a low temperature state in FIG. 8(c).

Referring to FIGS. 6, 7, 8(a), 8(b) and 8(c), the second embodiment differs from the first embodiment in that the focus correcting shaft 10 is arranged in parallel with the optical axis. For having the focus correcting shaft 10 in that position, the lens base plate 2 is provided with a focus correcting shaft holding part 2g. The lens holding frame 5 of the lens unit 3 is provided with an arm part 5e. The arm part 5e has a screw hole 5d formed coaxially with the focus correcting shaft 10. Another arm part 5f is formed in a diagonally located position in relation to the arm part 5e. The arm part 5f has its fore end formed in a U shape and slidably fitted on a shaft 2h, which is formed on the lens base plate 2.

The adjustment screw 12 pierces a hole 9e provided in the retaining plate 9 and is inserted into the screw hole 5d provided in the arm part 5e of the lens holding frame 5. The lens unit 3 is supported in its position in the direction of the optical axis with the fore end part of the adjustment screw 12 which pierces the screw hole 5d abutting on the focus correcting shaft 10 through the sheet 11. The spring 8 which is arranged between the arm part 5e and the retaining plate 9 urges the lens unit 3 to move backward with its spring force.

When the adjustment screw 12 is rotated clockwise, the lens holding frame 5 of the lens unit 3 is drawn out in the direction of the optical axis along the lead of the adjustment screw 12 while causing the spring 8 to be charged by this motion. Focus adjustment in the drawing-out direction of the lens unit 3 thus can be made by turning the adjustment screw 12 clockwise. When the adjustment screw 12 is rotated counterclockwise, on the other hand, the lens holding frame 5 of the lens unit 3 is drawn inward in the direction of the optical axis along the lead of the adjustment screw 12. Focus adjustment in the drawing-in direction of the lens unit 3 thus can be made by turning the adjustment screw 12 counterclockwise.

The lens barrel having the above-described construction in the second embodiment operates as follows when environment temperature varies.

(i) When environment temperature has changed from normal temperature to high temperature, the focus correcting shaft 10 expands as much as a value ΔhL as shown in FIG. 8(a). In association with this expansion, the adjustment screw 12 and the lens holding frame 5 of the lens unit 3 are pushed up as much as the value ΔhL in the direction of the optical axis by the end face 10a of the focus correcting shaft 10, while causing the spring 8 to be charged by this motion. A focus deviation under the high temperature condition thus can be corrected in this manner.

(ii) When environment temperature has changed from normal temperature to low temperature, the focus correcting shaft 10 contracts as much as a value ΔcL as shown in FIG. 8(c). In association with this contraction, the adjustment screw 12 and the lens holding frame 5 of the lens unit 3 are caused by the spring force of the spring 8 to be pushed down in the direction of the optical axis as much as the value ΔcL. A focus deviation under the low temperature condition thus can be corrected in this manner.

(iii) When environment temperature has changed from high temperature to normal temperature, the focus correcting shaft 10 contracts as much as the value ΔhL as shown in FIG. 8(b). In association with this contraction, the action described in the above paragraph (ii) is performed to push down the adjustment screw 12 and the lens holding frame 5 of the lens unit 3 as much as the value ΔhL, in the direction of the optical axis, to bring the lens unit 3 back to its state obtained under the normal temperature condition as shown in FIG. 8(b).

(iv) When environment temperature has changed from low temperature to normal temperature, the focus correcting shaft 10 expands as much as the value ΔcL as shown in FIG. 8(b). In association with this expansion, the action described in the above paragraph (i) is performed to push up the adjustment screw 12 and the lens holding frame 5 of the lens unit 3 as much as the value ΔcL in the direction of the optical axis. The lens unit 3 is thus brought back to its state obtained under the normal temperature condition as shown in FIG. 8(b).

In the case of the second embodiment, the focus correcting shaft 10 which expands or contracts according to temperature variation is disposed in parallel with the optical axis. The lens unit 3 is arranged to be moved forward or backward in the direction of the optical axis in association with the expansion or contraction of the focus correcting shaft 10. Therefore, even if a flange focal length is caused to elongate or shorten by temperature variation, the amount of change in length is effectively offset to give a sharply focused image.

Third Embodiment

FIGS. 9, 10, 11(a), 11(b) and 11(c) show a lens barrel according to a third embodiment of the invention. The mechanical structure of the third embodiment is about the same as that of the first embodiment. Therefore, all the structural elements that are identical with those of the first embodiment are denoted in FIG. 9 to FIGS. 11(a), 11(b) and 11(c) by the same reference numerals as in FIG. 1 to FIGS. 5(a), 5(b) and 5(c), and the details of them are omitted in the following description.

Figure 9:
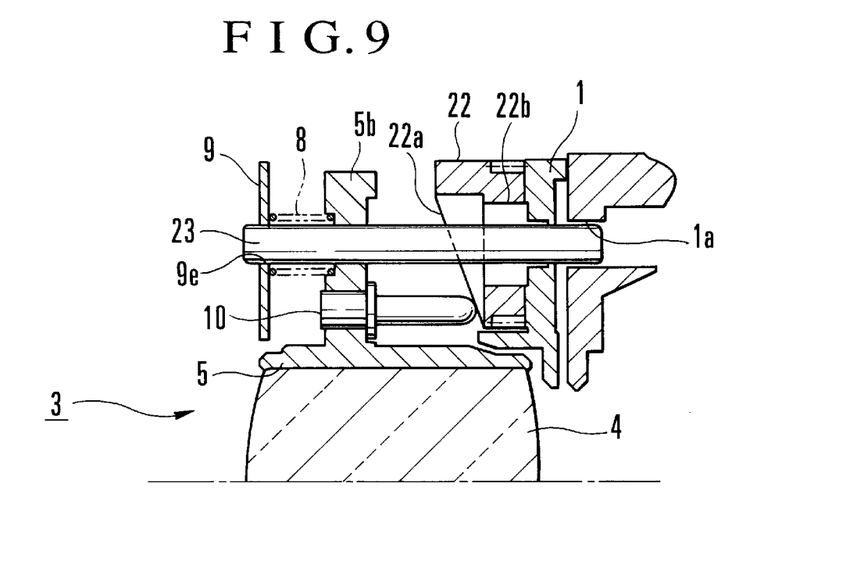
FIG. 9 is a sectional view showing essential parts of a lens barrel according to a third embodiment of the invention.
Figure 10:
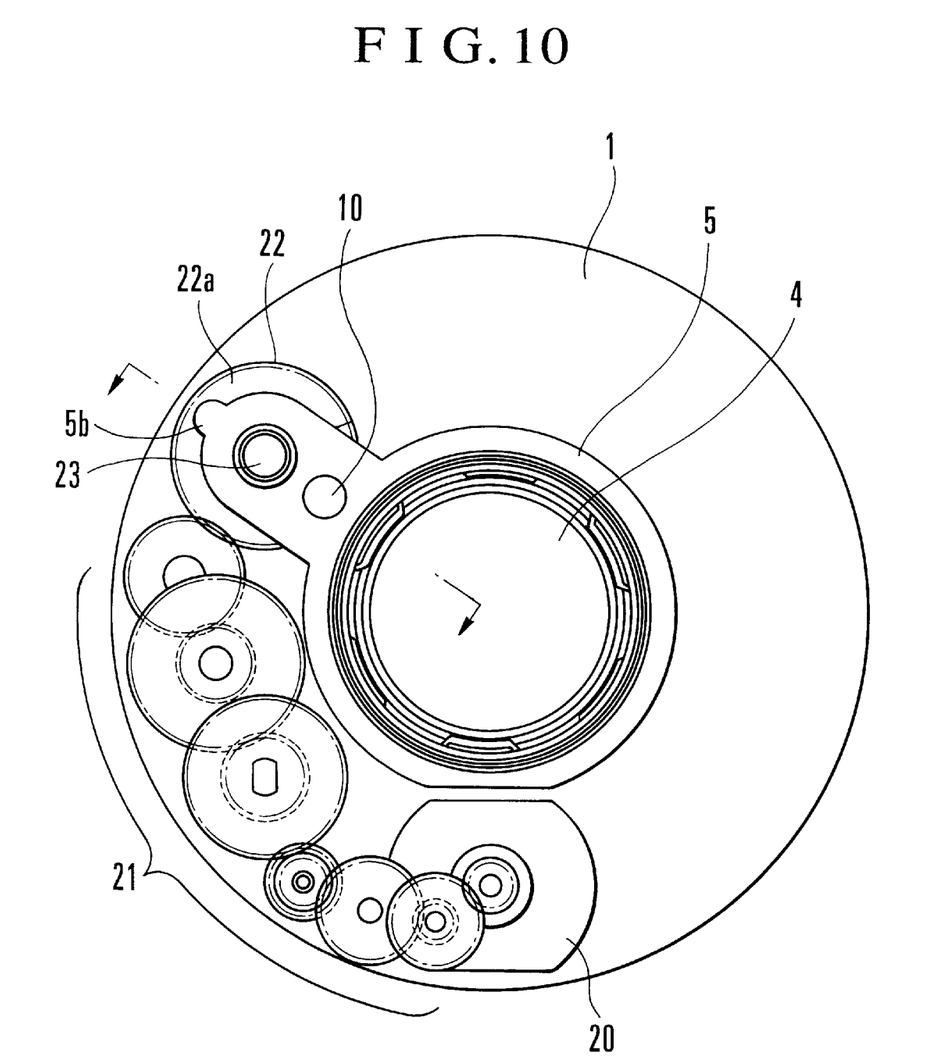
FIG. 10 is a front view showing a focus driving system of the lens barrel according to the third embodiment.
Figure 11A:
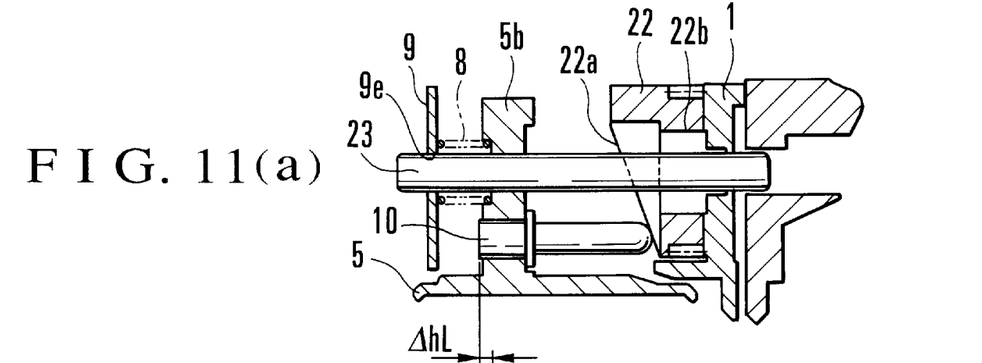
FIGS. 11(a), 11(b) and 11(c) are sectional views showing the states of a lens unit being caused to move in the direction of the optical axis by expansion and contraction of a correction member shown in FIG. 9, wherein the lens unit is shown in a high temperature state in FIG. 11(a), in a normal temperature state in FIG. 11(b) and in a low temperature state in FIG. 11(c).
Figure 11B:
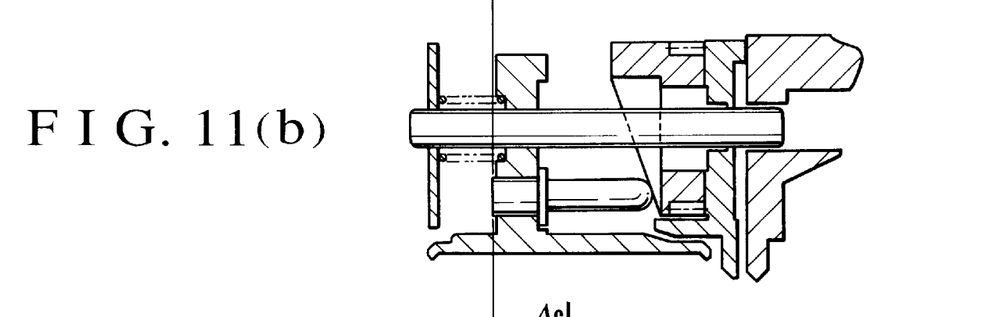
Figure 11C:
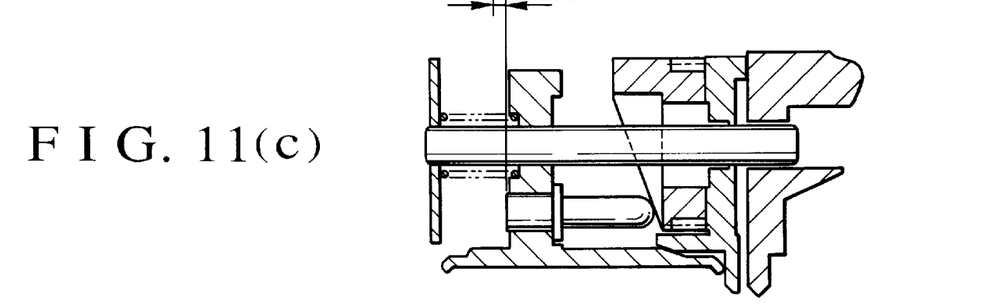

FIG. 9 is a sectional view showing essential parts of the lens barrel according to the third embodiment of the invention. FIG. 10 is a front view showing a focus driving part of the lens barrel. FIGS. 11(a), 11(b) and 11(c) show in sectional views expansion and contraction of a correction member in the direction of an optical axis due to temperature variation and states of a lens unit moving in the direction of the optical axis. The lens unit is shown in a high temperature state in FIG. 11(a), in a normal temperature state in FIG. 11(b) and in a low temperature state in FIG. 11(c).

Referring to FIGS. 9, 10, 11(a), 11(b) and 11(c), the lens barrel according to the third embodiment differs from the first embodiment in the following points. The focus correcting shaft 10 is arranged not only to be in parallel with the optical axis but also to be secured directly to the lens holding frame 5 of the lens unit 3. The fore end of the focus correcting shaft 10 is abutting on the cam face 22a of a cam gear 22 arranged to rotate in mesh with a focus driving system 21, which is arranged to be driven by a focus motor 20 shown in FIG. 10. The lens unit 3 is thus supported by the focus correcting shaft 10. When the cam gear 22 is caused to rotate by the output of the focus motor 20, therefore, the cam face 22a causes the lens unit 3 to move in the direction of the optical axis.

The focus motor 20 is secured to the shutter unit 1. The focus driving system 21 is supported by the shutter unit 1 so as to be rotatable. The cam gear 22 having the cam face 22a is intermeshing with the last stage of the focus driving system 21. The cam gear 22 is also supported by the shutter unit 1 so as to be rotatable in the same manner as the focus driving system 21.

The fore end of the focus correcting shaft 10 which is secured to the arm part 5b of the lens holding frame 5 of the lens unit 3 is formed in a spherical shape. The spherical fore end of the focus correcting shaft 10 is abutting on the cam face 22a of the cam gear 22. With the focus correcting shaft 10 moving along the cam face 22a, the lens unit 3 is caused to move in the direction of the optical axis.

The lens unit 3 is supported by a guide shaft 23 which is secured to the arm part 5b of the lens holding frame 5 and pierces a hole 22b formed in the center of the cam gear 22. The guide shaft 23 has its one end slidably fitted into a hole 1a formed in the shutter unit 1 and the other end slidably fitted into a hole 9e formed in the retaining plate 9.

The lens barrel having the above-described construction in the third embodiment operates as follows when environment temperature varies.

(i) When environment temperature has changed from normal temperature to high temperature, the focus correcting shaft 10 expands as much as a value ΔhL as shown in FIG. 11(a). This expansion causes the lens unit 3 to be pushed up in the direction of the optical axis, while causing the spring 8 to be charged by this motion. A focus deviation under the high temperature condition thus can be corrected in this manner.

(ii) When environment temperature has changed from normal temperature to low temperature, the focus correcting shaft 10 contracts as much as a value ΔcL as shown in FIG. 11(c). Then, this contraction causes the lens unit 3 to be pushed down by the spring force of the spring 8 in the direction of the optical axis. A focus deviation under the low temperature condition thus can be corrected in this manner.

(iii) When environment temperature has changed from high temperature to normal temperature, the focus correcting shaft 10 contracts as much as the value ΔhL as shown in FIG. 11(b). Then, this contraction causes the lens unit 3 to be pushed down by the action described in the above paragraph (ii) as much as the value ΔhL in the direction of the optical axis. The lens unit 3 is thus brought back to its state obtained under the normal temperature condition as shown in FIG. 11(b).

(iv) When environment temperature has changed from low temperature to normal temperature, the focus correcting shaft 10 expands as much as the value ΔcL as shown in FIG. 11(b). Then, this expansion causes the lens unit 3 to be pushed up by the action described in the above paragraph (i) as much as the value ΔcL in the direction of the optical axis. The lens unit 3 is thus brought back to its state obtained under the normal temperature condition as shown in FIG. 11(b).

The arrangement of the third embodiment applies to a camera of the kind arranged to be capable of focus driving for moving the lens unit 3 in the direction of the optical axis into an in-focus position. In the third embodiment, the focus correcting shaft 10 which is arranged in parallel with the optical axis to expand or contract according to temperature variation is secured to the lens unit 3. The lens unit 3 is thus arranged to be moved forward or backward in the direction of the optical axis by the expanding and contracting actions of the focus correcting shaft 10. Therefore, a sharply focused image can be obtained irrespectively of temperature variation, as in the cases of the first and second embodiments of the invention described in the foregoing.

Fourth Embodiment

Figure 12:
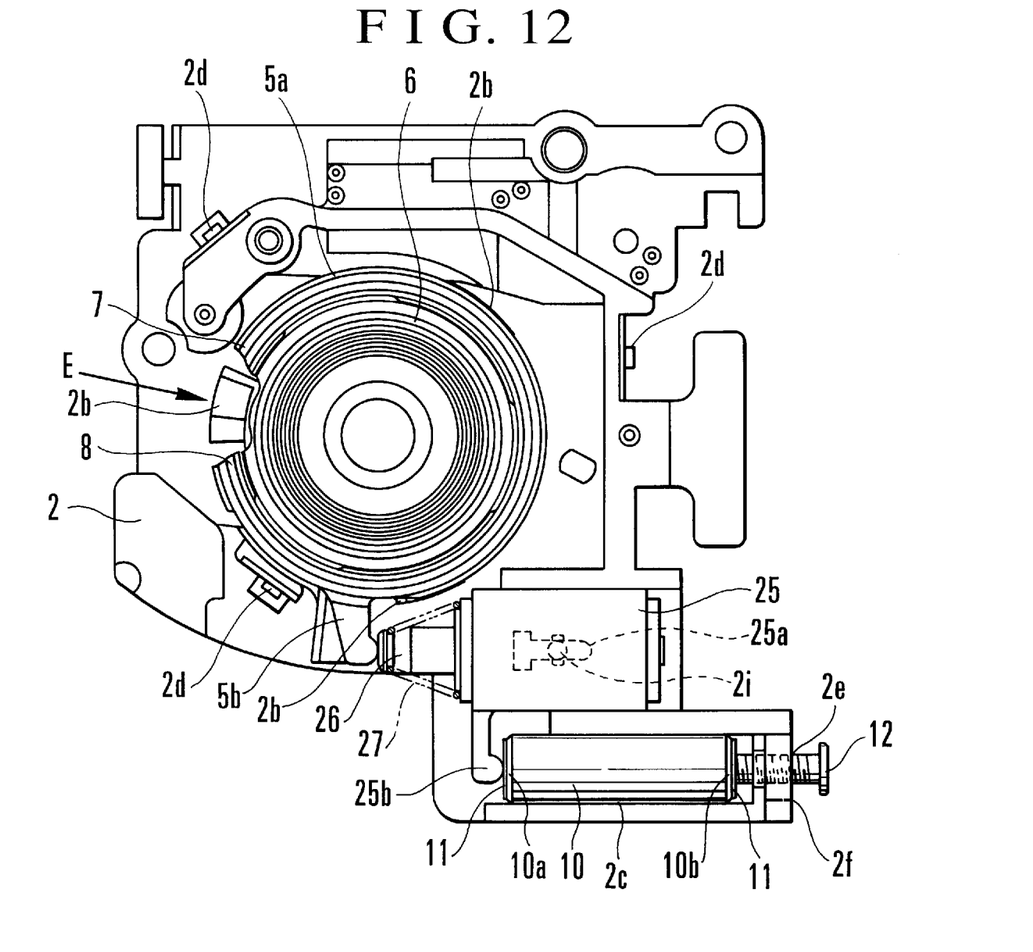
FIG. 12 is a front view showing essential parts of a lens barrel according to a fourth embodiment of the invention.
Figure 13:
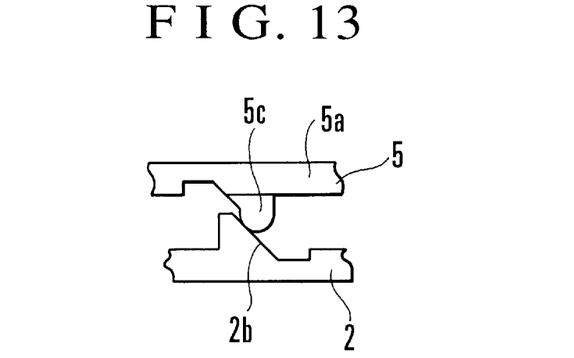
FIG. 13 is an enlarged view showing a lens unit supporting structure indicated by an arrow E in FIG. 12.

FIGS. 12 and 13 show a lens barrel according to a fourth embodiment of the invention. The mechanical structure of the fourth embodiment is about the same as that of the first embodiment. Therefore, all structural elements that are identical with those of the first embodiment are denoted in FIGS. 12 to 13 by the same reference numerals as in FIG. 1 to FIGS. 5(a), 5(b) and 5(c), and the details of them are omitted in the following description.

FIG. 12 is a front view showing essential parts of the fourth embodiment. FIG. 13 shows a part of FIG. 12 indicated by an arrow E showing the structural arrangement for the lens unit.

Referring to FIGS. 12 and 13, the fourth embodiment differs from the first embodiment in that an actuator 25 which is provided for driving the lens unit 3 in the direction of the optical axis is arranged in the direction orthogonally intersecting the optical axis and between the arm part 5b of the lens holding frame 5 and the end face 10a of focus correcting shaft 10.

The actuator 25 is provided with a slot 25a. A T-shaped shaft 2i which is formed on the lens base plate 2 is slidably fitted in the slot 25a. The actuator 25 is thus supported by the base plate 2. An arm part 25b formed on the actuator 25 is abutting on the end face 10a of the focus correcting shaft 10. The actuator 25 is thus arranged to be moved in the direction orthogonally intersecting the optical axis by the rotation of the adjustment screw 12 and the expansion or contraction of the focus correcting shaft 10.

When the actuator 25 is energized with current, a movable yoke 26 moves to the right, charging a spring 27 by this motion. At this time, the spring force of the spring 8 which is charged causes the lens unit 3 to rotate counterclockwise on the aperture part 2a of the lens base plate 2 along the three cam faces 2b of the lens base plate 2. The lens unit 3 is thus pushed down in the direction of the optical axis to permit focusing on a far distance point. When the current applied to the actuator 25 is turned off, the movable yoke 26 is caused by the spring force of the spring 27 to move to the left. The arm part 5b of the lens holding frame 5 of the lens unit 3 is pushed by the movable yoke 26. With the arm part 5b pushed, the lens holding frame 5 rotates clockwise on the aperture part 2a of the lens base plate 2 and, at the same time, is pushed up in the direction of the optical axis along the three cam faces 2b of the lens base plate 2 while causing the spring 8 to be charged by this motion. As a result, the lens unit 3 comes back to its initial position, i.e., a nearest distance position.

The arrangement of the fourth embodiment applies to a camera of the kind arranged to be capable of focus driving for moving the lens unit 3 in the direction of the optical axis into an in-focus position. In the fourth embodiment, the focus correcting shaft 10 which expands or contracts according to temperature variation is arranged in the direction orthogonally intersecting the optical axis. The actuator 25 is thus arranged to be moved in the direction orthogonally intersecting the optical axis to cause the lens unit 3 to rotate, in association with the expansion or contraction of the focus correcting shaft 10. While the lens unit 3 is thus caused to rotate, the lens unit 3 moves forward or backward in the direction of the optical axis along the three cam faces 2b of the lens base plate 2. Therefore, a sharply focused image can be obtained irrespectively of temperature variation, as in the cases of the first, second and third embodiments of the invention described in the foregoing.

In each of the first to fourth embodiments, the optical element is a photo-taking lens. However, in accordance with the invention, the optical element does not have to be a photo-taking lens but may be a prism or the like. The position correcting device for correcting the position of the optical element such as a lens can be mounted not only on a lens barrel but also on some other optical device of a camera or the like. Further, the optical element position correcting device may be mounted on a focusing device.

According to the invention, unlike conventional devices, positional deviations of an optical element such as a lens or the like resulting from temperature variation can be corrected by a compact mechanism without using any temperature sensor and also without changing the F-number of the optical element to a darker F-number.

Further, according to the invention, positional deviations of an optical element such as a lens resulting from temperature variation can be corrected by moving the optical element in the same direction as the expanding or contracting direction of a correcting member with a compact mechanism, without using any temperature sensor and without changing the F-number of the optical element to a darker F-number.

According to the invention, unlike conventional devices, positional deviations of an optical element such as a lens resulting from temperature variations can be corrected with a compact mechanism by utilizing optical element driving means to move the optical element in the same direction as the expanding or contracting direction of a correcting member, without using any temperature sensor and without changing the F-number of the optical element to a darker F-number.

Further, according to the invention, unlike conventional devices, positional deviations of an optical element such as a lens resulting from temperature variation can be corrected with a compact mechanism, by utilizing optical element driving means, without using a temperature sensor and without darkening the F-number of the optical element.

I claim:

1. An optical apparatus comprising:
an optical element holding frame arranged to hold an optical element;
a support member arranged to support said optical element holding frame for movement in a direction of an optical axis and having a cam for causing said optical element holding frame to move in the direction of the optical axis;
an actuator for driving said optical element holding frame; and
a correction member arranged to expand or contract in a direction orthogonally intersecting the optical axis according to temperature variation,
wherein said actuator moves in the direction orthogonally intersecting the optical axis in association with expansion or contraction of said correction member, and said optical element holding frame rotates following the movement of said actuator to be moved in the direction of the optical axis along the cam of said support member.

2. An optical device, comprising:

an optical element holding frame for holding an optical element;

a support member which supports said optical element holding frame movably in an optical axis direction and has a cam which moves said frame in the optical axis direction;

a correction member disposed in a direction vertically crossing the optical axis and expandable and contractable in response to temperature change, wherein the optical element holding frame rotates around the optical axis in association with the expansion and contraction of said correction member, and said optical element holding frame is moved in the optical axis direction along said cam; and an adjustment screw member which moves said correction member in a direction vertically crossing the optical axis and moves said optical element holding frame in the optical axis direction along the cam of the support member.

3. An optical apparatus according to one of claims, 1 and 2, wherein said correction member is formed in a cylindrical shape.

\* \* \* \* \*

UNITED STATES PATENT AND TRADEMARK OFFICE
CERTIFICATE OF CORRECTION

PATENT NO. : 6,212,021 B1
DATED : April 3, 2001
INVENTOR(S) : Hiroyuki Hase

Page 1 of 1

It is certified that error appears in the above-identified patent and that said Letters Patent is hereby corrected as shown below:

Column 7,
Line 41, delete "he" and insert -- the --.

Column 10,
Line 33, delete "c)f" and insert -- of --.

Signed and Sealed this

First Day of January, 2002

Attest:

JAMES E. ROGAN
Attesting Officer  Director of the United States Patent and Trademark Office